Nov. 5, 1968  T. P. KONEN  3,408,859

MEASUREMENT OF KINEMATIC VISCOSITY

Filed Jan. 25, 1966

INVENTOR.
Thomas P. Konen
BY
Eli Weiss
ATTORNEY

United States Patent Office 3,408,859
Patented Nov. 5, 1968

3,408,859
MEASUREMENT OF KINEMATIC VISCOSITY
Thomas P. Konen, Somerville, N.J., assignor to American Standard Inc., a corporation of Delaware
Filed Jan. 25, 1966, Ser. No. 522,887
10 Claims. (Cl. 73—54)

ABSTRACT OF THE DISCLOSURE

A flowing fluid is induced to assume a swirl component and a low pressure center, and the low pressure center is caused to precess about the central flow axis. Within a range of Reynolds numbers from about 200 to 5,000, the Strouhal ($fd/V$) and Reynolds ($Vd/\nu$) numbers in this system are correlated by the equation:

$$\frac{fd}{V} = k\frac{Vd}{\nu}$$

Accordingly, the kinematic viscosity of the fluid can be determined by measuring the frequency of precession, when the remaining variables V (the fluid flow velocity) and d (the diameter of the flowing fluid) are held constant.

---

This invention pertains to a method and apparatus for measuring the viscosity of fluids and more particularly to fluid viscosity measurements which are particularly suitable to the monitoring, controlling and recording of fluid viscosity in continuous flow and automatic process control systems.

Viscosity has always been an elusive variable in process measurements. In view of the rapid expansion of automated process control systems, there is an increased demand for rapid and reliable measurement of the viscosity of the fluids being processed. Most presently available viscometers are not adaptable for use in continuous measuring and recording systems since they are laboratory oriented like the capillary and falling sphere type. Those viscometers which have been adapted for continuous measurements have not been suitable for the direct measurement of kinematic viscosity. For example, rotational viscometers require many moving parts; those based on the Hagen-Poiseuille Law measure only absolute viscosity; and the ultrasonic type of viscometer requires special transmitting transducers and signal sources.

It is, therefore, a general object of the invention to provide an improved method and apparatus for measuring kinematic viscosity.

Another object of the invention is to provide an improved viscometer which is ideally suited for measuring and recording kinematic viscosity of a continuously flowing fluid and which may be readily incorporated into an automatic process control wherein the viscosity is continuously monitored for recording or feedback control.

A further object of the present invention is to provide an improved viscometer which, on the one hand, has no moving parts and requires a minimum of maintenance, while on the other hand, has greater sensitivity, a digital output and more universal application than presently available viscosity measuring devices.

Briefly, in this invention, the fluid whose viscosity is to be measured is first forced to have a swirl component by converting pressure energy into kinetic energy. The fluid is then induced into a particular state of hydrodynamic instability which causes the low pressure center of the swirling fluid to precess at a discrete frequency about the flow centerline.

This precession shall here be defined as swirl precession. The rate of precession is, in certain cases, inversely proportional to the kinematic viscosity of the fluid. More particularly, the precession of the swirling fluid is described by two dimensionless numbers: (1)

$$\text{Reynolds number} = \frac{Vd}{\nu}$$

and (2)

$$\text{Strouhal number} = \frac{fd}{V}$$

where
V = velocity of flowing fluid
d = diameter of the conduit within which the swirling fluid flows
f = frequency of precession
$\nu$ = kinematic viscosity At low Reynolds numbers where the viscous forces are predominant the Strouhal number is a function of the Reynolds number. For the range of low Reynolds numbers from about 200 to 5,000, the relationship is linear, i.e., $$\frac{fd}{V} = k\frac{Vd}{\nu}$$

If the velocity V and the conduit diameter d are constant, then the kinematic viscosity is inversely proportional to the frequency of precession.

Therefore, by providing a suitable sensor means to detect the cycling of the swirling fluid a signal is obtained which indicates the kinematic viscosity.

Other objects and many attendant advantages of the invention will be readily appreciated from the following detailed description when read with the accompanying drawing which shows, by way of example and not limitation, the now preferred embodiment of the invention.

Figure 1:
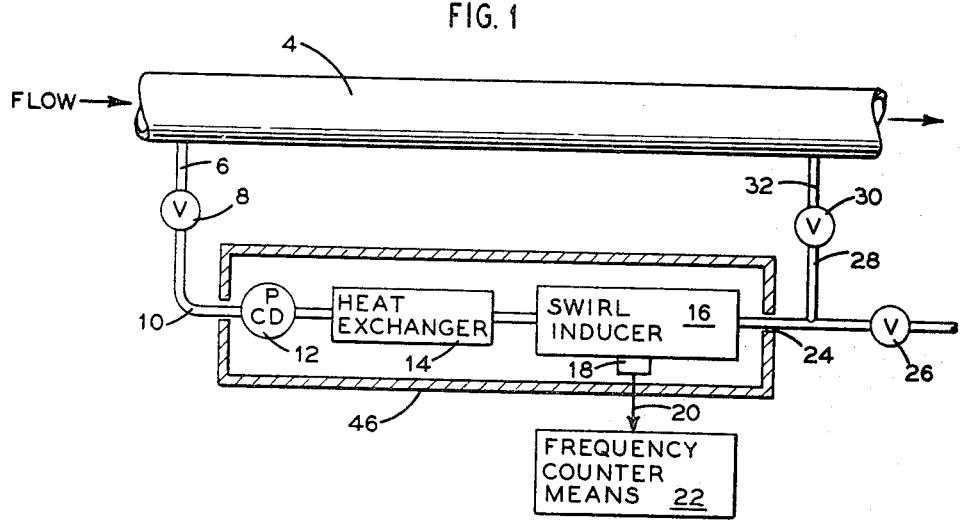
FIG. 1 is a drawing, partially in schematic, of apparatus for practicing the invention which includes a swirl inducer.

Referring now to FIG. 1, there is shown a conduit 4, through which continuously flows a fluid whose kinematic viscosity is to be measured. A tapping conduit 6 draws off a portion of the fluid and feeds it via a valve 8 and conduit 10 to a constant flow rate device such as positive displacement pump 12. Of course, it should be realized constant flow rate could equally be achieved by suitable pressure controllers and other methods known to those experienced in the field. The fluid then passes through heat exchanger 14, whose significance is hereinafter more fully described, to swirl inducer 16 wherein swirl precession occurs. The cycling swirl precession is converted to an electric signal by transducer 18 and fed via lead 20 to frequency counter means 22. The frequency recorded by means 22 which is suitably calibrated indicates the kinematic viscosity of the fluid.

The fluid after leaving swirl inducer 16 is fed from conduit 24 either via valve 26 to a drain, or via conduit 28, valve 30 and conduit 32 to the main flow conduit 4. Valves 8 and 30 may be closed when no viscosity measurements are desired.

Figure 2:
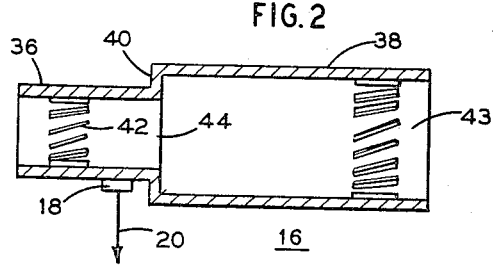
FIG. 2 is a sectional view of the swirl inducer of FIG. 1.

With reference to FIG. 2 there is illustrated the swirl inducer 16. A first fluid conductor means 36 and a second fluid conductor means 38—the second conductor means having an internal diameter larger than the internal diameter of the first conductor means—can be coupled together through an abrupt coupling means 40 such as a wall member positioned at substantially right angles to each of the conductor means. Swirl means 42 are coupled to the first fluid conductor means 36 to force the fluid flowing through the first conductor means into a swirling motion. The swirl means can be in the form of fixed blades positioned within the conductor means 36, or convolutions positioned within the interior surface of the conductor means 36 or vanes positioned along the interior surface of the conductor means 36. It has been found that the linearity of this device is determined by the design of the swirl means. For example, a linear device is obtained if fixed blades with a given exit angle with respect to the pipe axis are used. Transducer means 18 is positioned to best detect the cycling or frequency of the swirl precession. Straightening vanes 43 are provided to isolate the precessing flow from downstream conditions.

Figure 3:
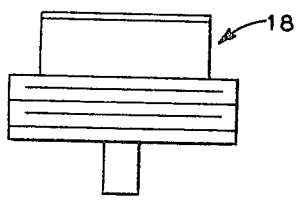
FIG. 3 shows an enlarged side view of a transducer incorporated in FIG. 2 for sensing for the cyclic precession of the fluid swirling in the swirl inducer of FIG. 1.

Since the swirling flow is precessing there are velocity, pressure and temperature fluctuations present in the flow. Therefore, there are several methods and transducers by which the freqeuncy of the swirl precession can be detected. A pressure sensitive means shown in FIG. 3 such as a diaphragm pressure transducer or piezoelectric crystal or the like can be utilized to measure the fluctuations of pressure; a velocity sensitive means such as a hot film anemometer, or hot wire anemometer, or the like can be utilized to measure the fluctuations of velocity; or a temperature sensitive means such as a thermocouple, or the like can be utilized to measure the fluctuations of temperature.

In operation, the fluid whose kinematic viscosity is to be determined, is fed to the first fluid conductor means 36 and exits from the second fluid conductor means 38. Swirl means 42 forces the fluid, which can be either gas or liquid, into a swirl condition. The presence of the enlargement 44 which the fluid encounters as it flows out of the first fluid conductor means 36 or first pipe having a substantially circular cross section and into the second fluid conductor means 38—a second pipe having a substantially circular cross section causes the swirling fluid to become unstable or, in other words, the center or axis of the swirling fluid traces a cone. The greater the kinematic viscosity of the fluid, the lower the frequency at which the axis of the swirling fluid precesses.

Now, to determine the kinematic viscosity, a frequency counter means 22 is fed by the transducer means 18 to count the occurrence of each cycle, usually in cycles per second. Thus, the frequency counter means will indicate the instantaneous kinematic viscosity of the fluid.

Heat exchanger 14 and constant temperature enclosure 46 are provided to eliminate ambient temperature effects. They permit the viscosity measurement to be made at process temperature or more likely at some fixed reference temperature.

It should be apparent that frequency counter means 22 can be provided with a calibrated scale to give direct readings of kinematic viscosity and can be provided with signal amplification and transmitting means to provide signals representing the viscosity which are fed to a central process control computer.

There has thus been shown an improved apparatus and method for measuring kinematic viscosity by introducing a swirl precession into the fluid and utilizing the frequency of precession to indicate kinematic viscosity.

Obviously many modifications and variations of the present invention are possible in the light of the above teachings. It is, therefore, to be understood that within the scope of the appended claims the invention may be practiced otherwise than as specifically described.

What is claimed is:

1. The method of measuring the kinematic viscosity of a flowing fluid comprising the steps of constraining the flowing fluid to have a constant velocity and a Reynolds number low enough that the viscous forces predominate over the inertia forces of the fluid, inducing the so constrained fluid to assume a swirl component and a low pressure center, causing the low pressure center of the swirling fluid to precess about the centerline of the flowing fluid and measuring the frequency of the precession which is linearly correlated to the kinematic viscosity of the flowing fluid in the range of Reynolds numbers from about 200 to about 5,000.

2. The method of claim 1 further comprising the step of maintaining the swirling fluid at a constant temperature.

3. Apparatus for measuring the kinematic viscosity of a fluid flowing in a conduit comprising first means for imparting to at least a portion of the flowing fluid a Reynolds number low enough that the viscous forces predominate over the inertia forces of the fluid and for causing said portion to flow at constant velocity, second means for forcing said portion to assume a swirl component of flow, third means for inducing the low pressure center of the swirling fluid to precess about the centerline of flow of the swirling fluid, and fourth means for measuring the frequency of precession which is linearly correlated to the kinematic viscosity of the fluid.

4. The apparatus of claim 3 further comprising means for maintaining at least the first, second and third means at the same constant temperature.

5. The apparatus of claim 3 wherein said second means comprises a first conduit of given cross section through which said portion of the fluid flows, said conduit having means for causing the fluid flowing therethrough to swirl and wherein said third means comprises a second conduit of uniform cross section greater than said given cross section and conductingly connected to said first conduit.

6. The apparatus of claim 3 further comprising straightening means for isolating the precessing flow from downstream conditions.

7. The apparatus of claim 3 wherein said fourth means includes mechanical or electro-mechanical transducer.

8. The apparatus of claim 7 wherein said fourth means includes a transducer positioned in the wall of said conduit, and frequency counter means connected to said transducer.

9. The apparatus of claim 5 further comprising heat exchanger means connected downstream of said first conduit.

10. The apparatus of claim 5 further comprising constant temperature enclosure means for maintaining the temperature of at least said conduits and the fluid therein constant.

References Cited

UNITED STATES PATENTS

| | | | |
|---|---|---|---|
| 2,233,561 | 3/1941 | Kalle | 73—54 |
| 2,794,341 | 6/1957 | Vonnegut. | |
| 3,024,642 | 3/1962 | Jones | 73—54 |
| 3,279,251 | 10/1966 | Chanaud. | |

FOREIGN PATENTS 148,254  12/1962  U.S.S.R.

S. CLEMENT SWISHER, *Acting Primary Examiner.*

JOSEPH W. ROSKOS, *Assistant Examiner.*